May 12, 1942.  F. H. SHEPARD, JR  2,282,895
RELAXATION OSCILLATION GENERATOR
Filed Dec. 7, 1940
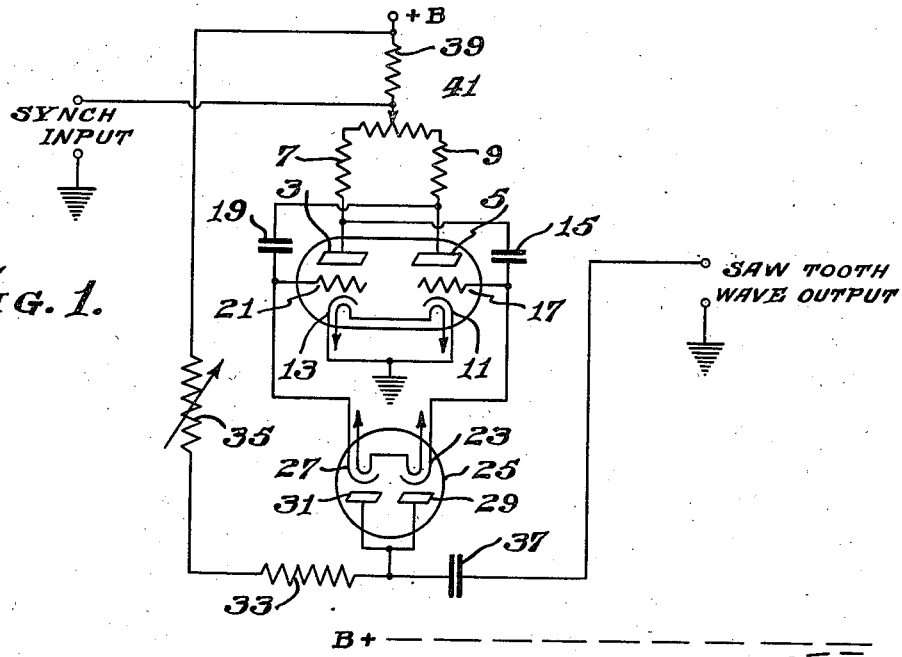
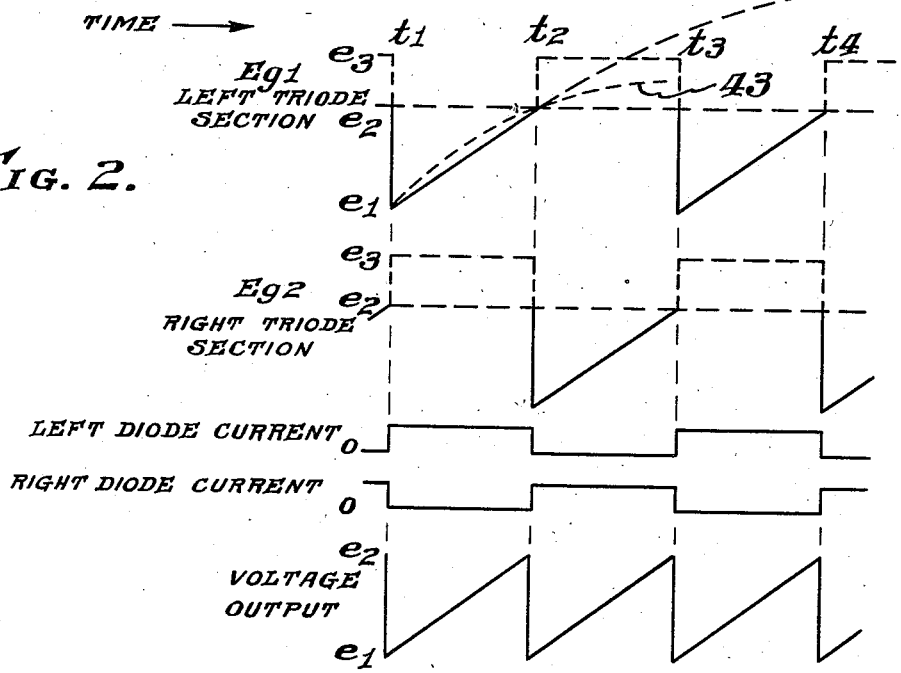
Francis H. Shepard, Jr. *Inventor*
By *Attorney*

Patented May 12, 1942

2,282,895

UNITED STATES PATENT OFFICE 2,282,895

RELAXATION OSCILLATION GENERATOR

Francis H. Shepard, Jr., Merchantville, N. J., assignor to Radio Corporation of America, a corporation of Delaware Application December 7, 1940, Serial No. 369,059

8 Claims. (Cl. 250—36)

This invention relates to oscillation generators and more particularly to oscillation generators of the relaxation type.

Relaxation oscillation generators of the general type herein to be described contain two discharge paths acting substantially in an alternative fashion and in which the current passing through each of the two discharge paths is interrupted whenever the current appears in the other discharge path. Such an oscillation generator has a resistance capacity member for each discharge path consisting of a condenser and a resistor connected in series, one side of the resistance capacity member being always connected, respectively, to the other discharge path, the other side of the resistance capacity member connected to a fixed potential such as ground potential.

The above described form of relaxation oscillation generators have the disadvantage that the frequency of the relaxation oscillations which they produce is influenced to a high degree by external disturbance caused by variations in the voltage supply and other interference.

In order to avoid this disadvantage, the resistance capacity member of each discharge path has been placed at a point of potential that is positive relative to the cathode as shown and described by Max Gieger Patent 2,159,792, May 23, 1939. The sensitivity to disturbances of the oscillation generator can, in this way, be decreased to a large extent.

The need for a relaxation oscillation generator sweep circuit in which the return time of the voltage is kept small with respect to the useful part of the wave up through the extremely high frequencies has long been felt. Heretofore, it has generally been necessary to charge the timing condenser during the return time of each cycle. Because of the fact that the storage condenser is of comparatively large value, the time required and the instantaneous current reached undesirable magnitudes, and it was necessary to utilize a comparatively large percentage of time cycle of the oscillator to charge the timing condenser.

According to this invention, the resistance capacity member of each discharge path is connected to a high positive potential with respect to the cathode of the discharge device in order to eliminate almost entirely the sensitivity of the relaxation oscillation generator to external disturbances and, in addition, provide a voltage having a saw-tooth wave form whose gradual change in potential is substantially uniform with respect to time.

According to this invention, the relaxation generator operates much as the conventional multivibrator with the exception that the charges built upon the control electrodes are allowed to leak off alternately through a common discharge or timing resistor. This common discharge resistor is made possible by the use of a duplex diode, as will be more fully described and, in turn, makes possible the generation of the saw-tooth voltage having a fundamental frequency double that of the multivibrator frequency. No capacities except the tube capacities have to be charged during the return part of the cycle. The timing condensers which generally had to be charged during the return time of the cycle can be charged during the interval elapsed during saw-tooth wave cycle. This means that the return time at the optimum saw-tooth frequency is not limited by the time it takes to charge the timing condenser. The tubes in the circuit do not have to supply extremely high instantaneous output currents, and a higher frequency saw-tooth wave may be generated than has heretofore been possible.

The primary object of this invention is to provide an oscillation generator capable of producing saw-tooth waves of a relatively high frequency.

Another object of this invention is to provide a relaxation oscillator which is less sensitive to external disturbances.

Other and incidental objects of the invention will be apparent to those skilled in the art from a reading of the following specification and an inspection of the accompanying drawing in which:

Figure 1 is a circuit diagram showing one form of this invention, and

Figure 2 is a graphical illustration of the operation of this invention.

Referring now in more detail to Fig. 1, a duplex triode 1 contains anodes 3 and 5 connected, respectively, to anode resistors 7 and 9. Cathodes 11 and 13 are connected together and to ground. A condenser 15 is connected between the anode 3 of the left-hand section of the duplex triode 1 and the control electrode 17 of the right-hand section of the duplex triode 1. A condenser 19 is connected between the anode 5 of the right-hand section of the duplex triode 1 and the control electrode 21 of the left-hand section of the duplex triode 1. The control electrode 17 is also connected to a cathode 23 of the duplex diode 25, and the control electrode 21 is also connected to the cathode 27 of the duplex diode 25. The anode 29 is part of the right-hand section of the diode 25 including the cathode 23. The anode 31 is part of the left-hand section of the diode 25 including the cathode 27. Anodes 29 and 31 are connected together and then, in turn, connected to the B+ voltage supply through resistance 33 and variable resistance 35. The output of the generator is coupled to the anodes 29 and 31 through coupling condenser 37.

Positive voltage relative to the cathodes is supplied to the anodes 3 and 5 of the discharge device 1 through resistor 39 and potentiometer 41.

Condenser 15 and common resistors 33 and 35 form the resistance capacity timing circuit for the right section of the discharge device 1 and in the same manner condenser 19 and common resistors 33 and 35 provide the resistance capacity timing member for the left section of the discharge device 1.

The operation of the circuit will now be explained in conjunction with Fig. 2 wherein there is represented a curve indicating the control electrode potential of the left triode section $Eg1$, and a curve indicating the control electrode potential of the right triode section $Eg2$. The left diode current, the right diode current and the voltage output is also shown in graphical form covering the period $t1$ to $t4$.

Beginning at time $t1$ the condenser 19 will be slowly discharged across the common resistors 33 and 35 in accordance with a function whose time constant is determined by the capacity of the condenser 19 and by the value of the resistances 33 and 35 whereby the control electrode 21 of the potential of the left triode section moves positively toward voltage $e2$.

For purposes of illustration, the curve through which the potential of the control electrode 21 moves is extended through a point $e2$, at time $t2$, to approach asymptotically the potential value represented by B+. The theoretical extension of the potential curve of the control electrode 21 is shown in dotted lines. The reason for the asymptotic approach to the line representing the B+ voltage is that the condenser 19 tends to discharge to the value of the B+ voltage because the resistors 33 and 35 through which the condenser 19 is discharged is connected to a potential B+.

If, for example, the discharge resistors 33 and 35 were connected to ground or cathode potential, the curve representing the potential of the control electrode 21 would approach cathode potential, or a potential lying in the vicinity $e2$ and $e3$, asymptotically as shown by dashed line 43. This would cause the line representing the potential on the control electrode 21 between the time $t1$ and $t2$ to be curved rather than substantially straight, as is indicated by the line illustrating the potential on control electrode 21 between $t1$ and $t2$.

When the potential control electrode 21 increases in a positive direction to the cut-off voltage for the left section of the discharge device 1, the anode 3 begins to draw current whereby the potential of the anode 3 decreases owing to the potential drop produced through the resistor 7. Hence, the potential of the control electrode 17 in the right section of the discharge device 1 decreases and likewise the plate current of the right section so that the voltage drop through the resistor 9 would be reduced whereupon the potential of the anode 5 of the right section of the tube of the discharge device 1 increases. This causes a further potential increase on the control electrode 21 of the left section so that the anode current of the left section increases still further and the anode current of the right section drops still further. This potential change takes place very rapidly and may be represented for purposes of illustration as a vertical line in the curve representing the voltage $Eg1$ of the control electrode 21.

This relation of the anode current of each of the sections of the discharge device 1 to the anode potential of the other respective section leads to a complete interruption of the anode current in the right section of the discharge device 1 containing anode 5 and control electrode 17. This causes the potential in the control electrode 21 of the left triode section to remain at a potential $e3$ during the time in which current flow through the right triode section is cut off.

As the potential of the control electrode 21 increases beyond the value $e2$, the potential across the left section of the diode 25 is such that the potential of the cathode 27 is positive with respect to its corresponding anode 31 preventing any further current flow. It will thus be seen that the condenser 19 is disconnected from the discharging resistors 33 and 35. However, at time $t2$ the potential of the control electrode 17 of the right triode section drops in a negative direction causing the cathode 23 of the diode 25 to go negative with respect to its corresponding anode 29 and thus cause the right section of the duplex diode to pass current and slowly discharge the timing condenser 15 through the common discharge path 33 and 35.

By referring to Fig. 2 it will be seen that the portion of the curve representing the control electrode voltage of each section of the duplex triode 1 which is sufficiently negative as to cause its corresponding cathode of the duplex diode 25 to pass current through the discharge path comprising resistors 33 and 35 will be shown in a solid line, while that portion of each curve representing a control electrode potential of such a positive value as to open the discharge path as previously described, is shown in a dotted line.

It will thus be seen that each of the charging condensers 15 and 19 will be charged during the period in which their respective sections of the discharge device 1 will be disconnected from the output circuit so that they may be charged over a long period of time during which the opposite section is producing the saw-tooth output wave.

The left diode current curve shows that the left diode is conducting during the time at which the control electrode voltage of the left triode section is more negative than $e2$ or between times $t1$ and $t2$ which produces the long sloping portion of the saw-tooth wave in the output circuit. At time $t2$ when the potential of the control electrode of the left triode section reaches value $e2$ and starts to increase in a positive direction therebeyond the potential of the cathode 27 of the left diode section exceeds in a positive direction the potential on the anode 31 of the left section of the duplex diode 25 so that the left diode current drops to zero during time $t2$ and $t3$. During this time $t2$ to $t3$, however, the drop in a negative direction of the potential on the control electrode 17 of the right triode section causes the right diode section to become conducting from time $t2$ to $t3$.

The discharge of the timing condensers 15 and 19 alternately through the duplex diode 25 results in a voltage output curve as shown by the saw-tooth wave from extending between the voltage values $e1$ and $e2$ and occurring at double frequency to the frequency at which each of the sections of the discharge device 1 is operating.

External synchronizing voltage may be applied to the anode circuit as shown at a point between the resistor 39 and potentiometer 41. Potentiometer 41 is provided in order to balance any slight unbalance there may be in the two sections of the discharge device 1. The adjustment of this potential 41 will provide alternate saw-tooth waves having equal amplitudes.

Values of the condenser 15 and 19 are preferably the same, but their values may be such as to provide a wave form having any desired characteristic.

While one system for putting this invention into effect has been indicated and described, it will be apparent to one skilled in the art that this invention is by no means limited to the particular organization shown and described, but that many modifications may be made without departing from the scope of this invention as set forth in the appended claims.

I claim as my invention:

1. In an oscillator for producing a saw-tooth wave form including a pair of electron discharge devices each of which includes a cathode, a control electrode and an anode, means including anode resistances for maintaining said anodes positive with respect to said cathodes, means including electron storage devices for connecting the anode of each discharge device to the control electrode of the other discharge device, and a pair of unilateral conducting impedances for connecting said control electrodes to a source of potential positive with respect to said cathodes.

2. In an oscillator for producing a saw-tooth wave form including a pair of electron discharge devices each of which includes a cathode, a control electrode and an anode, means including anode resistances for maintaining said anodes positive with respect to said cathodes, means including electron storage devices for connecting the anode of each discharge device to the control electrode of the other discharge device, and the combination of a unilateral conducting impedance connected to the control electrode of each electron discharge device and a resistance for connecting the other end of said impedances to a source of potential positive with respect to said cathodes.

3. In an oscillator for producing a saw-tooth wave form including a pair of electron discharge devices each of which includes a cathode, a control electrode and an anode, means including anode resistances for maintaining said anodes positive with respect to said cathodes, means including electron storage devices for connecting the anode of each discharge device to the control electrode of the other discharge device, the combination of a unilateral conducting impedance connected to the control electrode of each tube, a resistance connected to the other ends of said impedances, and means for maintaining the other end of said resistance at a potential positive with respect to said cathode.

4. In an oscillator for producing a saw-tooth wave form including a pair of electron discharge devices each of which includes a cathode, a control electrode and an anode, means including anode resistances for maintaining said anodes positive with respect to said cathodes, means including electron storage devices for connecting the anode of each discharge device to the control electrode of the other discharge device, the combination of a unilateral conducting impedance connected to the control electrode of each tube, a resistance connected to the other ends of said impedances, means for maintaining the other end of said resistance at a potential positive with respect to said cathode, and means for applying external synchronizing pulses to said anode.

5. In an oscillator for producing a saw-tooth wave form including a pair of electron discharge devices each of which includes a cathode, a control electrode and an anode, and means including electron storage devices for connecting the anode of each discharge device to the control electrode of the other discharge device, the combination of a unilateral conducting impedance connected to the control electrode of each tube, a resistance connected to the other ends of said impedances and means for maintaining the other end of said resistance at a potential positive with respect to said cathode, and an output circuit including a series electron storage device connected to said resistance.

6. In an oscillator for producing a saw-tooth wave form including a pair of electron discharge devices each of which includes a cathode, a control electrode and an anode, means including anode resistances for maintaining said anodes positive with respect to said cathodes, and means including electron storage devices for connecting the anode of each discharge device to the control electrode of the other discharge device, the combination of a rectifier connected to the control electrode of each electron discharge device and a resistance for connecting the other end of the rectifiers to a source of potential positive with respect to said cathodes.

7. In an oscillator for producing a saw-tooth wave form including a pair of electron discharge devices each of which includes a cathode, a control electrode and an anode, the combination of means including anode resistances for maintaining said anodes positive with respect to said cathodes, means including electron storage devices for connecting the anode of each discharge device to the control electrode of the other discharge device, a pair of rectifiers each having a cathode and an anode, said rectifier cathode connected to the control electrode of each electron discharge device, and a resistance for connecting the rectifier anodes to a source of potential positive with respect to said electron discharge device cathodes.

8. An oscillator for producing a sawtooth wave comprising in combination a pair of discharge devices each having a cathode, a control electrode, and an anode, an electron storage device connected between the anode of each of said discharge devices and the control electrode of the other discharge device, and a pair of unilateral conducting impedances for connecting said control electrodes to a source of potential positive with respect to said cathodes.

FRANCIS H. SHEPARD, Jr.